US012802608B2

(12) United States Patent
Eom et al.

(10) Patent No.: US 12,802,608 B2
(45) Date of Patent: Nov. 17, 2026

(54) DISPLAY APPARATUS AND METHOD FOR DRIVING DISPLAY PANEL

(71) Applicant: Wuhan Tianma Microelectronics Co., Ltd., Wuhan (CN)

(72) Inventors: Euncheol Eom, Wuhan (CN); Jiayi Sun, Wuhan (CN); Suil Ku, Wuhan (CN); Shimeng Lv, Wuhan (CN); Yanmu Lin, Wuhan (CN); Lingli Wang, Wuhan (CN)

(73) Assignee: Wuhan Tianma Microelectronics Co., Ltd., Wuhan (CN)

( * ) Notice: Subject to any disclaimer, the term of this patent is extended or adjusted under 35 U.S.C. 154(b) by 0 days.

(21) Appl. No.: 19/242,995

(22) Filed: Jun. 19, 2025

(65) Prior Publication Data

US 2025/0316204 A1 Oct. 9, 2025

(30) Foreign Application Priority Data

Mar. 6, 2025 (CN) ......................... 202510264848.3

(51) Int. Cl.
*G09G 3/20* (2006.01)

(52) U.S. Cl.
CPC ... *G09G 3/2074* (2013.01); *G09G 2300/0819* (2013.01); *G09G 2310/08* (2013.01); *G09G 2320/0233* (2013.01); *G09G 2320/0247* (2013.01); *G09G 2320/045* (2013.01)

(58) Field of Classification Search
CPC ......... G09G 3/2074; G09G 2300/0819; G09G 2310/08; G09G 2320/0233; G09G 2320/0247; G09G 2320/045; G09G 3/3233
See application file for complete search history.

(56) References Cited

U.S. PATENT DOCUMENTS

| | | | | |
|---|---|---|---|---|
| 12,165,599 | B2 * | 12/2024 | Park | G09G 3/3233 |
| 2017/0103696 | A1 * | 4/2017 | Li | G09G 3/2074 |
| 2021/0027720 | A1 * | 1/2021 | Park | G09G 3/3291 |
| 2022/0076634 | A1 * | 3/2022 | Yoon | G09G 3/3233 |
| 2022/0139330 | A1 * | 5/2022 | Kwon | G06F 3/1431<br>345/204 |
| 2022/0375400 | A1 * | 11/2022 | Kim | G09G 3/32 |
| 2023/0086572 | A1 * | 3/2023 | Kwon | G09G 3/3233<br>345/204 |
| 2024/0412692 | A1 * | 12/2024 | Lai | G09G 3/3233 |

* cited by examiner

*Primary Examiner* — Amy Onyekaba
(74) *Attorney, Agent, or Firm* — Wiersch Law Group

(57) ABSTRACT

A display apparatus and a method for driving a display panel are provided, so as to improve brightness uniformity of different regions of the display panel. In the display apparatus, the display panel includes a first display region and a second display region. A drive controller is configured to calculate a difference of image data of the first display region between a current frame and a previous frame, and enable the display panel to operate in a multi-frequency mode or a conventional mode according to the difference. In the multi-frequency mode, the first display region has a different drive frequency from the second display region. In the conventional mode, the first display region has a same drive frequency as the second display region.

15 Claims, 13 Drawing Sheets

DISPLAY APPARATUS AND METHOD FOR DRIVING DISPLAY PANEL

CROSS-REFERENCE TO RELATED APPLICATIONS

The present application claims priority to Chinese Application No. 202510264848.3 with the application title of "DISPLAY APPARATUS AND METHOD FOR DRIVING DISPLAY PANEL", filed on Mar. 6, 2025, the content of which is incorporated herein by reference in its entirety.

TECHNICAL FIELD

The present disclosure relates to the field of display technologies, and in particular, to a display apparatus and a method for driving a display panel.

BACKGROUND

With continuous development of science and technologies, more and more electronic equipment with display functions are widely used in people's daily life and work, bringing great convenience to people's daily life and work, and becoming an indispensable and important tool in modern society. A main component of the electronic device which realizes the display function is a display panel.

In the Multi-frequency Display (MFD) technology, the display panel includes at least two display regions driven at different frequencies. Currently, there is a problem of uneven brightness between display regions driven at different frequencies.

SUMMARY

An aspect of the present disclosure provides a display apparatus. The display apparatus includes a display panel and a drive controller. The display panel includes a first display region and a second display region. The drive controller is configured to calculate a difference of image data between a current frame and a previous frame, and enable the display panel to operate in a multi-frequency mode or a conventional mode according to the difference. In the multi-frequency mode, the first display region has a different drive frequency from the second display region. In the conventional mode, the first display region has a same drive frequency as the second display region.

Another aspect of the present disclosure provides a method for driving a display panel. The display panel includes a first display region and a second display region. The method includes: calculating a difference between image data in a current frame and image data in a previous frame, and enabling the display panel to operate in a multi-frequency mode or a conventional mode according to the difference. In the multi-frequency mode, the first display region has a different drive frequency from the second display region. In the conventional mode, the first display region has a same drive frequency as the second display region.

BRIEF DESCRIPTION OF DRAWINGS

In order to more clearly illustrate technical solutions of embodiments of the present disclosure, the accompanying drawings used in the embodiments are briefly described below. It should be noted that the accompanying drawings described below are merely some embodiments of the present disclosure, and other drawings may be obtained by those skilled in the art according to these drawings.

DESCRIPTION OF EMBODIMENTS

In order to better understand technical solutions of the present disclosure, embodiments of the present disclosure are described in detail below in conjunction with the drawings.

It should be noted that, the described embodiments are merely some but not all of the embodiments of the present disclosure. Based on the embodiments of the present disclosure, all other embodiments obtained by those ordinary skilled in the art shall fall within the protection scope of the present disclosure.

Terms used in the embodiments of the present disclosure are only for the purpose of describing specific embodiments, and are not intended to limit the present disclosure. The terms "a/an", and "the/said" in a singular form in an embodiment of the present disclosure and the attached claims are also intended to include plural forms thereof, unless explicitly noted otherwise in the context.

It should be understood that the term "and/or" used herein is merely an association relationship describing an associated object, and indicates that there may be three relationships, for example, A and/or B, and may indicate only A, both A and B, and only B. In addition, the symbol "/" in the context generally indicates that the relation between the objects in front and at the back of "/" is an "or" relationship.

Figure 1:
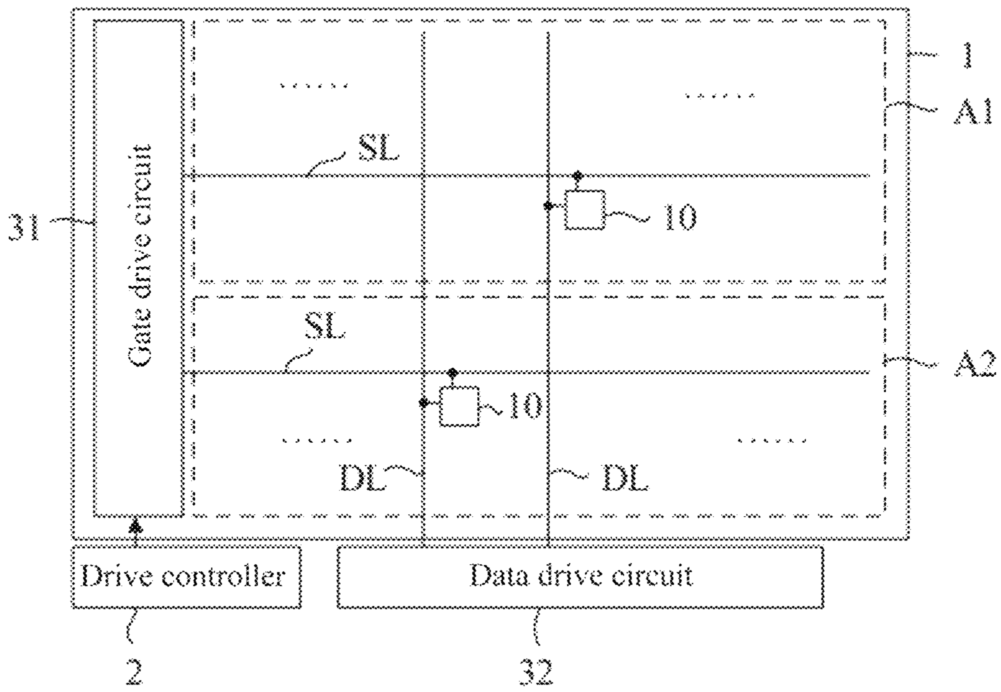
FIG. 1 is a schematic diagram of a display apparatus according to an embodiment of the present disclosure.

An embodiment of the present disclosure provides a display apparatus, which may be any device having a display function, such as a mobile phone, a tablet computer, a laptop computer, an electronic paper book, a television, and a smart watch. As shown in FIG. 1, which is a schematic diagram of a display apparatus according to an embodiment of the present disclosure, the display apparatus includes a display panel 1 and a drive controller 2, and the drive controller 2 is configured to drive the display panel 1 to display.

In an embodiment of the present disclosure, as shown in FIG. 1, the display panel 1 includes a first display region A1 and a second display region A2. The first display region A1 and the second display region A2 include a plurality of sub-pixels 10, respectively.

In an embodiment of the present disclosure, the drive controller 2 is configured to calculate a difference of image data between a current frame and a previous frame, and enable the display panel 1 to operate in a multi-frequency mode or a conventional mode according to the difference. In the multi-frequency mode, a drive frequency of the first display region A1 is different from the drive frequency of the second display region A2. In the conventional mode, a drive frequency of the first display region A1 is the same as a drive frequency of the second display region A2.

Figure 2:
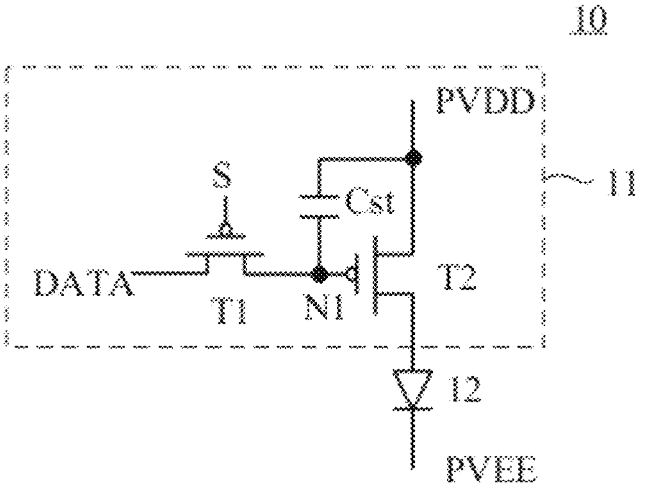
FIG. 2 is a circuit diagram of a sub-pixel according to an embodiment of the present disclosure.

In an embodiment, with reference to FIG. 1 and FIG. 2, FIG. 2 is a circuit diagram of a sub-pixel according to an embodiment of the present disclosure, and the sub-pixel 10 includes a pixel drive circuit 11 and a light-emitting element 12 that are electrically connected. The pixel drive circuit 11 is configured to drive the light-emitting element 12 to emit light. The pixel drive circuit receives the first power voltage PVDD and the data voltage DATA, and generates the drive current according to the first power voltage PVDD and the data voltage DATA.

In an embodiment of the present disclosure, as shown in FIG. 2, the pixel drive circuit 11 includes a first thin film transistor T1, a second thin film transistor T2 and a storage capacitor Cst. A first electrode of the first thin film transistor T1 is electrically connected to the data voltage terminal DATA. A second electrode of the first thin film transistor T1 is electrically connected to a gate electrode of the second thin film transistor T2, and a gate electrode of the first thin film transistor T1 is electrically connected to the scan signal terminal S. One of the first electrode and the second electrode is a source electrode, and the other one is a drain electrode. A first electrode of the second thin film transistor T2 is electrically connected to the first power supply voltage terminal providing the first power supply voltage PVDD, and a second electrode of the second thin film transistor T2 is electrically connected to the light-emitting element 12. The light-emitting element 12 is electrically connected to a second power supply voltage terminal providing a second power supply voltage PVEE. The first electrode plate of the storage capacitor Cst is electrically connected to the first power supply voltage terminal providing the first power supply voltage PVDD, and the second electrode plate of the storage capacitor Cst is electrically connected to the gate of the second thin film transistor T2. The current flowing through the light-emitting element 12 is related to the gate-source voltage difference of the second thin film transistor T2, that is, related to the data voltage DATA and the first power supply voltage PVDD.

In an embodiment, as shown in FIG. 1, the display panel 1 further includes a scan line SL and a data line DL electrically connected to the sub-pixel 10. The scan line SL is electrically connected to the scan signal terminal S of the pixel drive circuit 11. The data line DL is electrically connected to the data voltage terminal DATA of the pixel drive circuit 11.

As shown in FIG. 1, the display apparatus further includes a gate drive circuit 31 and a data drive circuit 32. The gate drive circuit 31 provides a scan signal S (labeled the same as the scan signal terminal S of the pixel drive circuit) to the scan line SL. The data drive circuit 32 is configured to provide a data voltage DATA (labeled the same as the data voltage terminal DATA of the pixel drive circuit) to the data line DL according to the image data.

In an embodiment of the present disclosure, the drive frequency may be understood as a frequency of refreshing the data voltage DATA written into the pixel drive circuit 11. That is, a frequency of an enable level of the above scan signal S.

As shown in FIG. 1, the gate drive circuit 31 may be electrically connected to the drive controller 2. In an embodiment of the present disclosure, the drive controller 2 may separately send, in response to signals corresponding to different differences, a first mode control signal corresponding to the multi-frequency mode and a second mode control signal corresponding to the conventional mode.

Under the action of the first mode control signal, the gate drive circuit 31 may make the frequency of the enable level of the scan signal S provided to the first display region A1 to be different from that of the enable level of the scan signal S provided to the second display region A2.

Under the action of the second mode control signal, the gate drive circuit 31 may make the frequency of the enable level of the scan signal S provided to the first display region A1 to be the same as that of the enable level of the scan signal S provided to the second display region A2.

In an embodiment of the present disclosure, in the multi-frequency mode, display images of the first display region A1 and the second display region A2 may be different. The drive controller 2 may determine the drive frequency of the display region according to a type of the image to be displayed in the display region, such as a still image or a moving image. For example, the first display region A1 may display the moving image, such as a video. The second display region A2 may display the still image, such as a text or a picture. In the multi-frequency mode, a drive frequency of the first display region A1 may be greater than a drive frequency of the second display region A2. That is, the first display region A1 is a high-frequency region, while the second display region A2 is a low-frequency region. In an embodiment, the difference may be a difference of the image data between the current frame and the previous frame in the first display region A1.

In the process of implementing the embodiments of the present disclosure, the inventors have found that: In the case that the load difference corresponding to the image data in two adjacent frames is significant, the signal on the first power supply line for providing the first power supply voltage PVDD in the display panel 1 may change greatly, thereby affecting the current flowing through the light-emitting element and affecting the brightness of the light-emitting element. If the display panel drives the first display region A1 and the second display region A2 at different frequencies at this time, there will be a large difference in brightness between the two, resulting in a screen flickering problem.

Figure 3:
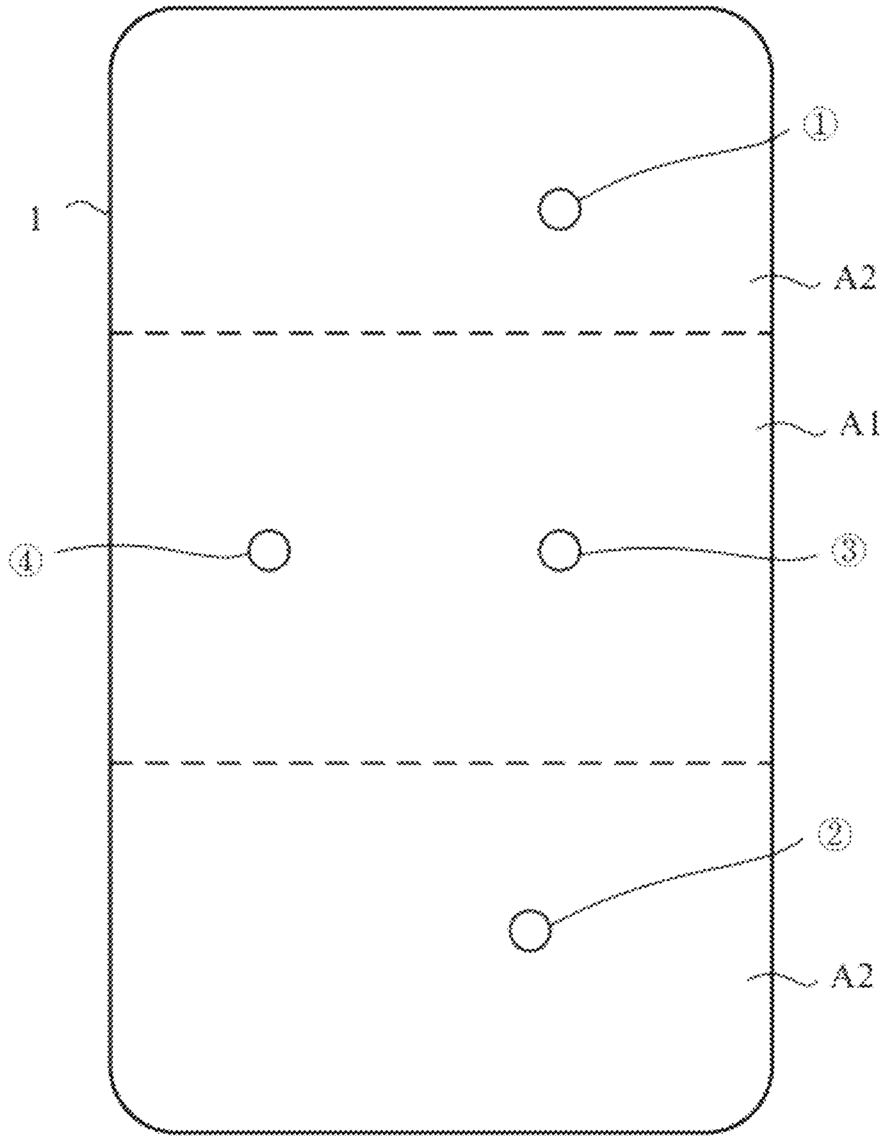
FIG. 3 is a partitioned schematic diagram of a display panel according to an embodiment of the present disclosure.
Figure 4:
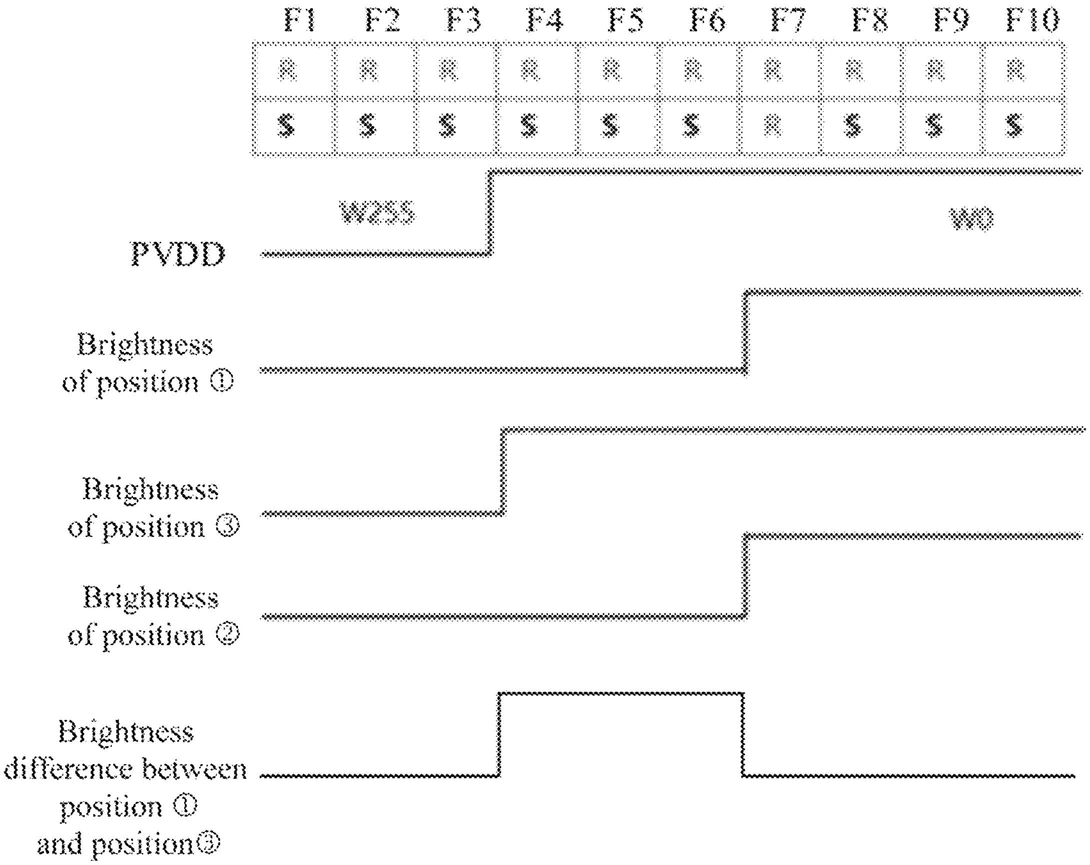
FIG. 4 is a schematic diagram of brightness changes of different positions in the first display region and the second display region shown in FIG. 3 during different time periods.

With reference to FIG. 3 and FIG. 4, FIG. 3 is a schematic diagram of a partition of a display panel according to an embodiment of the present disclosure, and FIG. 4 is a schematic diagram of brightness changes at different positions in the first display region and the second display region shown in FIG. 3 in different time periods. The first display region A1 is driven at 120 Hz. The second display region A2 is driven at 10 Hz. Time periods F1 to F10 are refresh frames of the first display region A1, the time period F7 is a refresh frame of the second display region A2, and time periods F1 to F6 and time periods F8 to F10 are skip frames of the second display region A2. That is, the second display region A2 performs data voltage refresh during period F7, and does not perform the refresh of the data voltage during time periods F1 to F6 and time periods F8 to F10.

Taking the image data received at the position ④ in the first display region A1 in the time period F4 being switched from 255 grayscale (W255 shown in FIG. 4) to 0 grayscale (W0 shown in FIG. 4) as an example, a large change in the display grayscale will cause a significant change in the load of the display panel, thereby causing a significant change in the first power supply voltage PVDD received by the pixel drive circuit 11, resulting in a change in the brightness of the position ③ in the first display region A1.

And the second display region A2 is in the stage of not refreshing data during the time period F4. As shown in FIG. 2, the voltage change on the first power supply voltage terminal PVDD affects the N1 node in the pixel drive circuit 11 in the second display region A2 through coupling. Therefore, the second display region A2 can maintain the brightness of the previous stage at this time, thereby causing a significant difference between the brightness of the first display region A1 and the brightness of the second display region A2. As can be seen from FIG. 4, the brightness difference period between the first display region A1 at the position ② and the second display region A2 at the position ① lasts from the time period F4 to the time period F7.

In an embodiment of the present disclosure, the drive controller 2 is provided in the display apparatus, the difference of the image data between the current frame and the previous frame is calculated by the drive controller 2, and the display panel 1 operates in the multi-frequency mode or the conventional mode according to the difference.

For example, when the difference is relatively large, the drive controller 2 may control the display panel 1 to operate in the conventional mode, that is, the first display region A1 and the second display region A2 are driven at the same frequency. Taking the example shown in FIG. 3, where position ④ in the first display region A1 switches from a 255 grayscale to a 0 grayscale during time period F4, although this drastic grayscale transition may cause a significant fluctuation in the first power supply voltage (PVDD), the method proposed in this embodiment ensures that both the first display region A1 and the second display region A2 refresh their data voltages during this time period, which allows the brightness variation of both display regions to be similar, thereby reducing or even eliminating brightness difference between them, improving the brightness consistency of the display panel, and thus enhancing the display effect.

When the difference is small, the drive controller 2 may control the display panel 1 to operate in the multi-frequency mode, for example, in the embodiments of the present disclosure, the first display region A1 may be driven at a high-frequency, and the second display region A2 may be driven at a low-frequency, thereby improving the image fluency of the first display region A1 and reducing the power consumption of the second display region A2.

It should be noted that the pixel drive circuit 11 shown in FIG. 2 is merely illustrative, and the structure of the pixel drive circuit 11 may also be designed differently according to different design requirements, for example, the pixel drive circuit 11 may be designed as a "7T1C" structure including 7 thin film transistors and 1 storage capacitor, and the specific structure of the pixel drive circuit 11 is not limited in the embodiments of the present disclosure.

In an embodiment, in this embodiment of the present disclosure, positions of the first display region A1 and the second display region A2 may be fixed, or may change according to a change of the to-be-displayed image.

In an embodiment of the present disclosure, when the difference is greater than the first preset value, the drive controller 2 is configured to enable the display panel 1 to operate in the conventional mode. When the difference is less than or equal to the first preset value, the drive controller 2 is configured to enable the display panel to operate in the multi-frequency mode.

In an embodiment, the first preset value may be set according to structural and performance requirements of the display panel, which is not limited in the embodiments of the present disclosure.

Figure 5:
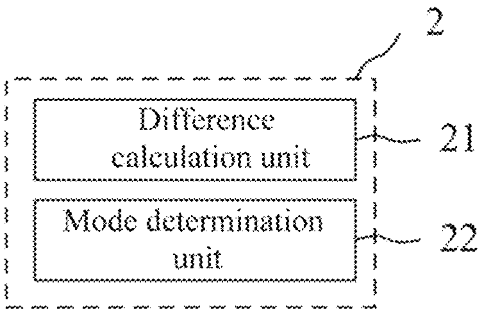
FIG. 5 is a modular schematic diagram of a drive controller according to an embodiment of the present disclosure.

In an embodiment of the present disclosure, as shown in FIG. 5, which is a modular schematic diagram of a drive controller according to an embodiment of the present disclosure, and the drive controller 2 includes a difference calculation unit 21 and a mode determination unit 22. The difference calculation unit 21 is configured to calculate a difference of image data of any sub-pixel between a current frame and a previous frame, and send the difference to the mode determination unit 22. The mode determination unit 22 is configured to enable the display panel 1 to operate in a multi-frequency mode or a conventional mode according to the difference.

In an embodiment, the mode determination unit 22 may be electrically connected to the gate drive circuit 31 shown in FIG. 1. Mode determination unit 22 may issue a mode control signal in response to signals issued by difference calculation unit 21 corresponding to different differences. For example, the mode control signal includes the first mode control signal corresponding to the multi-frequency mode and the second mode control signal corresponding to the conventional mode.

In an embodiment of the present disclosure, the difference calculation unit 21 includes a current calculation sub-unit, and the current calculation sub-unit is configured to calculate a drive current of any sub-pixel 10 in a corresponding frame, and use the drive current as image data of the sub-pixel 10 in the corresponding frame. The drive current WAPLn of any sub-pixel 10 satisfies:

$$WAPLn = k \times \mathrm{Gray} \times \mathrm{Gray}/(Gmax \times Gmax);$$

where k is a coefficient corresponding to the sub-pixel 10, coefficients k corresponding to sub-pixels 10 with different light-emitting colors may be different, Gray is a grayscale of the sub-pixel 10 in a corresponding frame, and Gmax represents a peak grayscale. For example, when the display panel 1 supports 8-bit grayscale voltage resolution, the peak grayscale is 255.

In an embodiment of the present disclosure, the difference ΔWAPLn of the image data between the current frame and the previous frame satisfies:

$$\Delta WAPLn = k \times (Gray1 - Gray2)^2 / Gmax^2.$$

Gray1 is a grayscale of the sub-pixel 10 in a current frame, and Gray2 is a grayscale of the sub-pixel 10 in a previous frame. Based on this arrangement, the difference of image data between the current frame and the previous frame may be obtained according to the grayscales of the sub-pixels 10 in two adjacent frames, and then the operation mode of the display panel 1 may be determined according to the difference.

Figure 6:
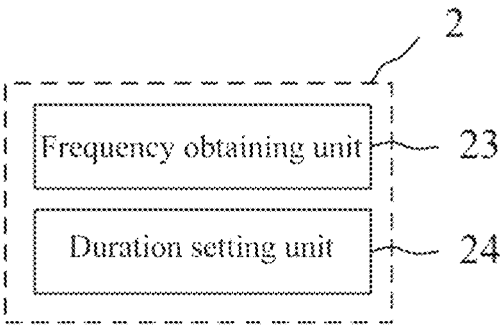
FIG. 6 is a modular schematic diagram of another drive controller according to an embodiment of the present disclosure.

In an embodiment, as shown in FIG. 6, which is a modular schematic diagram of another drive controller according to an embodiment of the present disclosure, and the drive controller 2 further includes a frequency acquisition unit 23 and a duration setting unit 24. In an embodiment of the present disclosure, when a difference between the image data in a current frame and the image data in a previous frame is greater than the first preset value, the frequency acquisition unit 23 is configured to obtain an occurrence frequency at which the difference is greater than the first preset value, and send the occurrence frequency to the duration setting unit 24. The duration setting unit 24 is configured to control an operating duration of the display panel 1 in the conventional mode according to the occurrence frequency.

In an embodiment of the present disclosure, the duration setting unit 24 is configured to control the operating duration of the display panel 1 in the conventional mode to be a duration of one frame when the occurrence frequency is less than or equal to a first reference frequency. In an embodiment of the present disclosure, when entering the next frame, the difference calculation unit 21 may continue to calculate the difference between the image data in the two adjacent frames in real time, and adjust the operation mode of the display panel 1 in real time according to the difference.

In addition, when the occurrence frequency is greater than the first reference frequency, the duration setting unit 24 may control the operating duration of the display panel 1 in the conventional mode to be greater than the duration of one frame, and the difference calculating unit 21 may stop calculating the difference between the image data in two adjacent frames during a time period in which the display panel operates in the conventional mode. Based on this arrangement, when the occurrence frequency at which the difference of the image data between the current frame and the previous frame is greater than the first preset value is relatively high, the operating duration of the display panel 1 in the conventional mode may be prolonged, thereby avoiding frequent switching between the conventional mode and the multi-frequency mode of the display panel 1. On the one hand, it can reduce the power consumption of the display apparatus, save computing power, and on the other hand, it can also avoid the flickering problem of the display panel caused by frequent switching of operation modes.

Figure 7:
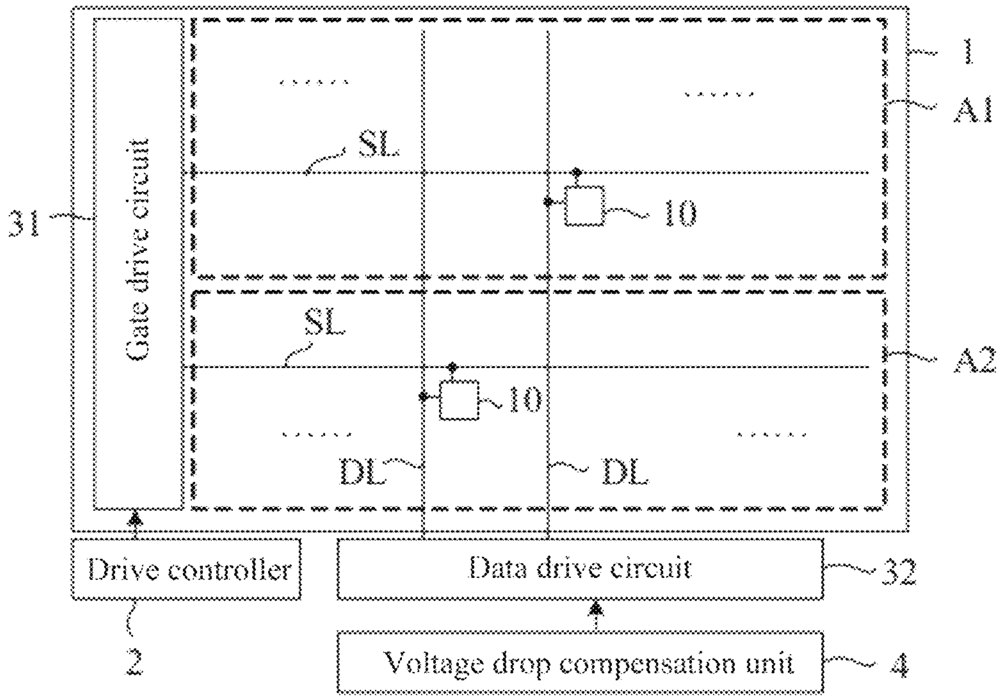
FIG. 7 is a modular schematic diagram of a voltage drop compensation unit according to an embodiment of the present disclosure.

In an embodiment, as shown in FIG. 7, which is a schematic diagram of a display apparatus according to another embodiment of the present disclosure, the display apparatus further includes a voltage drop compensation unit 4, and the voltage drop compensation unit 4 is configured to compensate for a voltage drop (IR drop compensation, IRC) of the first power supply voltages PVDD received by different sub-pixels 10 with the data voltage DATA. For example, when the difference between the image data in two adjacent frames is relatively large, by adopting the arrangement provided by this embodiment of the present disclosure, the voltage drop of the first power supply voltage PVDD can be compensated by the voltage drop compensation unit 4, thereby compensating the influence of the change of the first power supply voltage PVDD on the drive current of the sub-pixel 10, improving the brightness stability of the first display region A1 and the second display region A2, further improving the brightness uniformity of the display panel, and weakening the flickering problem.

In an embodiment of the present disclosure, the voltage drop compensation unit 4 may compensate the voltage drop of the first power supply voltage PVDD in real time, or may delay a period of time, for example, delay one frame for compensation.

Figure 8:
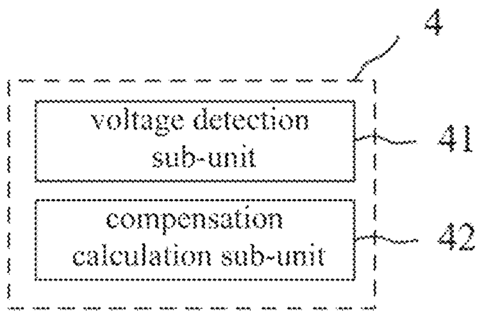
FIG. 8 is a modular schematic diagram of another voltage drop compensation unit according to an embodiment of the present disclosure.

In an embodiment, with reference to FIG. 7 and FIG. 8, FIG. 8 is a modular schematic diagram of a voltage drop compensation unit according to an embodiment of the present disclosure, and the voltage drop compensation unit 4 includes a voltage detection sub-unit 41 and a compensation calculation sub-unit 42. The voltage detection sub-unit 41 is configured to detect an actual value of a first power supply voltage PVDD received by the pixel drive circuit 11. The compensation calculation sub-unit 42 is configured to calculate a difference between the actual value and an ideal value of the first power supply voltage, and send a compensation value generated according to the difference between the actual value and the ideal value, to the data drive circuit 32. The data drive circuit 32 may provide the compensated data voltage DATA to the pixel drive circuit 11 according to the compensation value.

Figure 9:
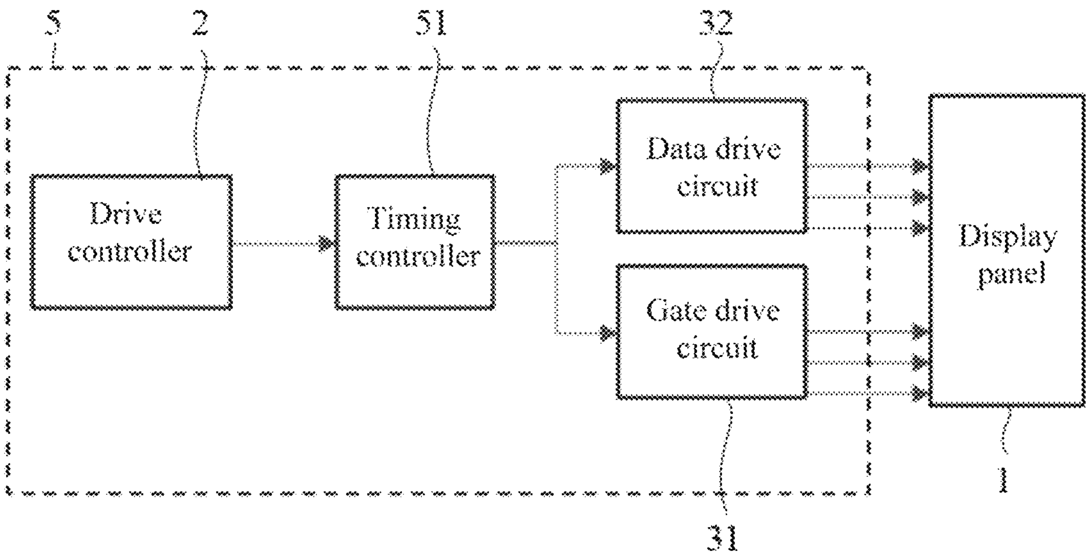
FIG. 9 is a modular schematic diagram of a display apparatus according to an embodiment of the present disclosure.

In an embodiment of the present disclosure, as shown in FIG. 9, which is a modular schematic diagram of a display apparatus according to an embodiment of the present disclosure, the display apparatus includes a drive IC 5. The drive IC 5 includes a timing controller 51. The timing controller 51 is electrically connected to the drive controller 2. The drive controller 2 is configured to output a mode control signal to the timing controller 51. The mode control signal is configured to enable the timing controller 51 to control the display panel 1 to switch between the multi-frequency mode and the conventional mode. As shown in FIG. 9, the timing controller 51 is electrically connected to the gate drive circuit 31 and the data drive circuit 32.

In an embodiment, at least one of the drive controller 2, the gate drive circuit 31, and the data drive circuit 32 may be integrated into the drive IC 5. FIG. 9 illustrates that the drive controller 2, the gate drive circuit 31 and the data drive circuit 32 are all integrated into the drive IC 5.

Figure 10:
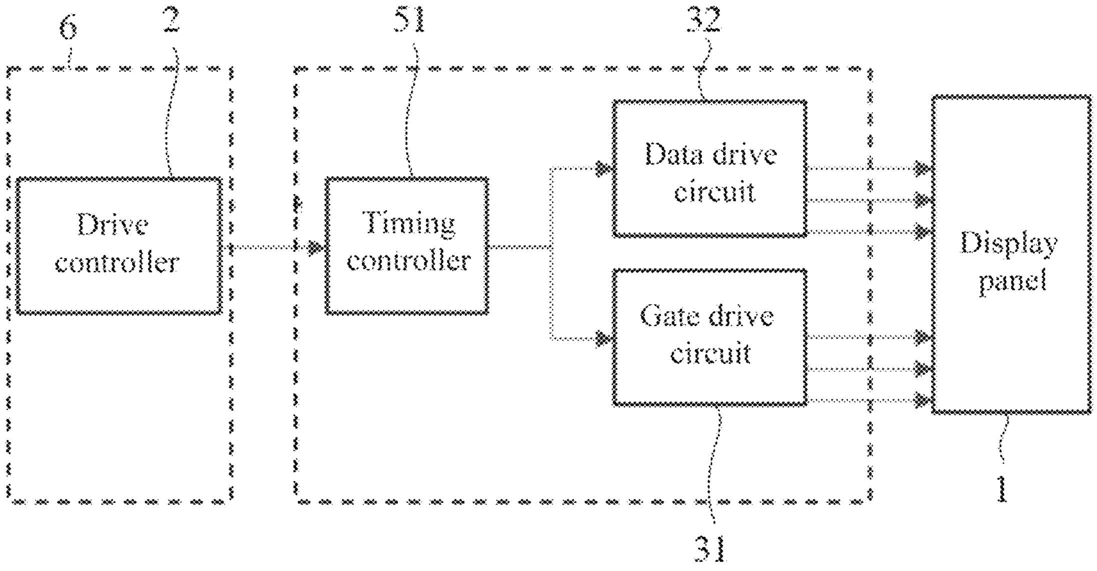
FIG. 10 is a modular schematic diagram of a display apparatus according to another embodiment of the present disclosure.

In an embodiment of the present disclosure, as shown in FIG. 10, which is a schematic block diagram of a display apparatus according to another embodiment of the present disclosure, the display apparatus further includes an application management module 6, and the application management module 6 is electrically connected to the timing controller 51. In this embodiment of the present disclosure, the drive controller 2 can also be integrated into the application management module 6.

Figure 11:
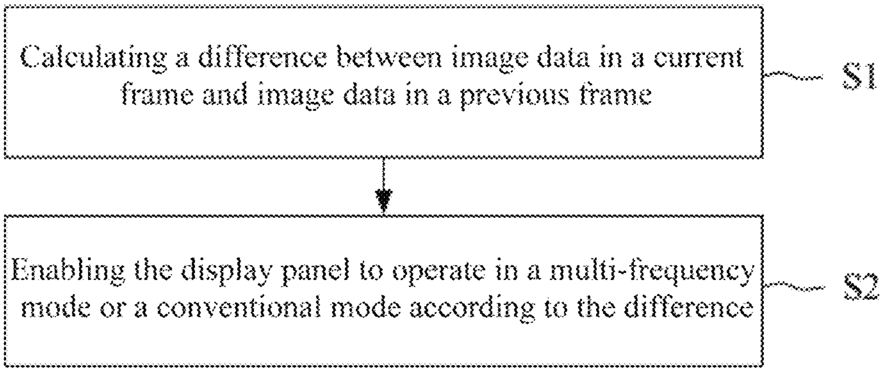
FIG. 11 is a schematic diagram of a method for driving a display panel according to an embodiment of the present disclosure.

Based on the same inventive concept, an embodiment of the present disclosure further provides a method for driving a display panel, as shown in FIG. 1 and FIG. 11, FIG. 11 is a schematic diagram of a method for driving a display panel according to an embodiment of the present disclosure, the display panel 1 includes a first display region A1 and a second display region A2, and the method includes the following steps.

Step S1: a difference of the image data between a current frame and a previous frame is calculated.

Step S2: the display panel 1 operates in the multi-frequency mode or the conventional mode according to the difference.

In the multi-frequency mode, the drive frequency of the first display region A1 is different from the drive frequency of the second display region A2. For example, the drive frequency of the first display region A1 may be greater than the drive frequency of the second display region A2. In an embodiment, the difference may be a difference of the image data between the current frame and the previous frame in the first display region A1.

In the conventional mode, a drive frequency of the first display region A1 is equal to a drive frequency of the second display region A2.

According to the method for driving the display panel 1 provided by the embodiments of the present disclosure, a difference between image data in a current frame and image data in a previous frame is calculated, and the display panel 1 operates in a multi-frequency mode or a conventional mode according to the difference.

For example, when the difference is relatively large, the display panel 1 operates in a conventional mode, that is, the first display region A1 and the second display region A2 are driven at a same frequency, so that the brightness of the first display region A1 and the second display region A2 changes to a similar degree when the image data in two adjacent frames changes greatly, thereby reducing or even eliminating the brightness difference therebetween, improving the brightness consistency of the display panel, and thus improving the display effect.

In addition, when the difference is relatively small, the display panel 1 operates in the multi-frequency mode, that is, the first display region A1 and the second display region A2 are driven at different frequencies. For example, in the embodiments of the present disclosure, the first display region A1 may be driven at a high-frequency, and the second display region A2 may be driven at a low-frequency, thereby improving the image fluency of the first display region A1 and reducing the power consumption of the second display region A2.

Figure 12:
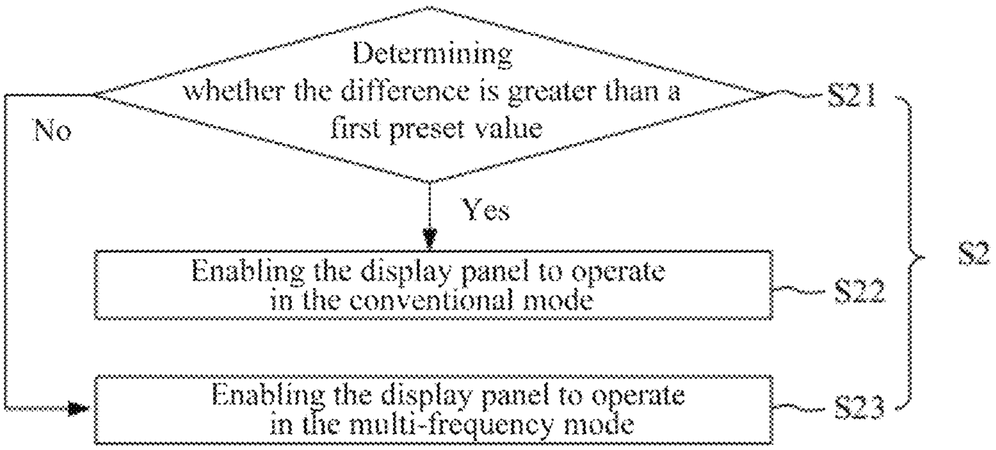
FIG. 12 is a schematic diagram of a method for driving a display panel according to another embodiment of the present disclosure.

In an embodiment of the present disclosure, as shown in FIG. 12, which is a schematic diagram of a method for driving a display panel according to another embodiment of the present disclosure, the step S2 includes the following steps.

Step S21: whether the difference is greater than a first preset value is determined. If so, step S22 is executed. If not, i.e., when the difference is less than or equal to the first preset value, step S23 is executed.

Step S22: the display panel operates in the conventional mode.

Step S23: the display panel operates in the multi-frequency mode.

In an embodiment of the present disclosure, calculating the difference of the image data between a current frame and a previous frame in step S1 includes:

calculating a difference of current of any sub-pixel between a current frame and a previous frame, wherein a current WAPLn of any sub-pixel of a corresponding frame satisfies:

$$WAPLn = k \times \text{Gray} \times \text{Gray}/(Gmax \times Gmax);$$

and where k is a coefficient corresponding to the sub-pixel 10, coefficients k corresponding to sub-pixels 10 with different light-emitting colors may be different, Gray is a grayscale of the sub-pixel 10 in a corresponding frame, and Gmax represents a peak grayscale. For example, when the display panel 1 supports 8-bit grayscale voltage resolution, the peak grayscale is 255.

Figure 13:
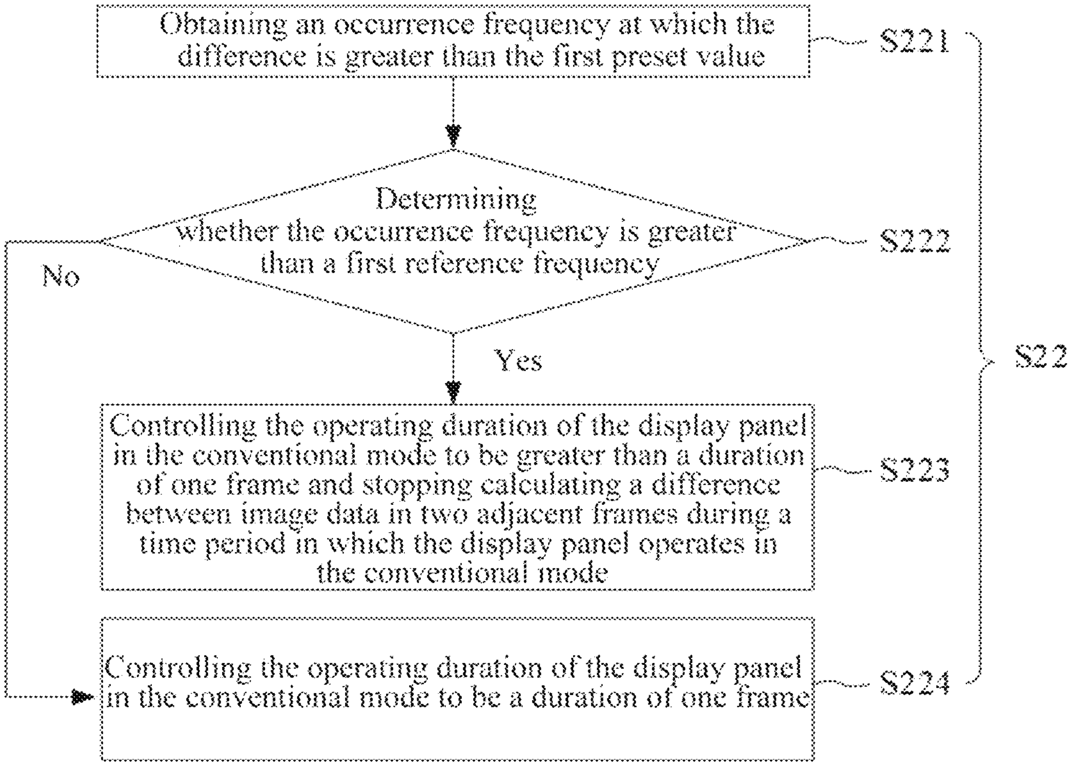
FIG. 13 is a schematic diagram of a method for driving a display panel according to another embodiment of the present disclosure.

In an embodiment of the present disclosure, as shown in FIG. 13, which is a schematic diagram of a method for driving a display panel according to another embodiment of the present disclosure, when a difference between the image data in the two adjacent frames is greater than a first preset value, the step S22 of operating the display panel 1 in a conventional mode includes the following steps.

Step S221: an occurrence frequency at which the difference is greater than the first preset value is obtained.

Step S222: whether the occurrence frequency is greater than a first reference frequency is determined. If so, step S223 is executed. If not, i.e., if the occurrence frequency is less than or equal to the first reference frequency, step S224 is executed.

Step S223: the operating duration of the display panel 1 in the conventional mode to be longer than a duration of one frame is controlled, and the calculation of the difference between the image data in two adjacent frames within the period of the display panel 1 operating in the conventional mode is stopped. Based on this arrangement, when the occurrence frequency at which the difference of the image data between the current frame and the previous frame is greater than the first preset value is relatively high, the operating duration of the display panel 1 in the conventional mode may be prolonged, thereby avoiding frequent switching between the conventional mode and the multi-frequency mode of the display panel 1. On the one hand, it can reduce the power consumption of the display apparatus, save computing power, and on the other hand, it can also avoid the flickering problem of the display panel caused by frequent switching of operation modes.

Step S224: an operating duration of the display panel 1 in the conventional mode is controlled to be a duration of one frame. In an embodiment of the present disclosure, when entering the next frame, the difference between the image data in two adjacent frames may be continuously calculated, and the operation mode of the display panel 1 is adjusted in real time according to the difference.

The above are merely exemplary embodiments of the present disclosure, which, as mentioned above, are not used to limit the present disclosure. Whatever within the principles of the present disclosure, including any modification, equivalent substitution, improvement, etc., shall fall into the protection scope of the present disclosure.

Finally, it should be noted that the technical solutions of the present disclosure are illustrated by the above embodiments, but not intended to limit thereto. Although the present disclosure has been described in detail with reference to the foregoing embodiments, those skilled in the art can understand that the present disclosure is not limited to the specific embodiments described herein, and can make various modifications, readjustments, and substitutions without departing from the scope of the present disclosure.

What is claimed is:

1. A display apparatus, comprising:

a display panel comprising a first display region and a second display region; and a drive controller, configured to calculate a difference of image data between a current frame and a previous frame, and enable the display panel to operate in a multi-frequency mode or a conventional mode according to the difference, wherein in the multi-frequency mode, the first display region has a different drive frequency from the second display region;

wherein in the conventional mode, the first display region has a same drive frequency as the second display region;

wherein the first display region and the second display region comprise sub-pixels;

wherein the drive controller comprises a difference calculation unit; and wherein the difference calculation unit comprises a current calculation sub-unit configured to calculate a drive current of any one of the sub-pixels in a corresponding frame, and use the drive current as the image data of the sub-pixel in the corresponding frame.

2. The display apparatus according to claim 1, wherein the drive controller is configured to enable the display panel to operate in the conventional mode when the difference is greater than a first preset value; and the drive controller is configured to enable the display panel to operate in the multi-frequency mode when the difference is less than or equal to the first preset value.

3. The display apparatus according to claim 1, wherein the drive controller further comprises a mode determination unit;

wherein the difference calculation unit is configured to calculate a difference between image data of any one of the sub-pixels in a current frame and image data of the one of the sub-pixels in a previous frame, and send the difference to the mode determination unit; and wherein the mode determination unit is configured to enable the display panel to operate in a multi-frequency mode or a conventional mode according to the difference.

4. The display apparatus according to claim 3, wherein a drive current WAPLn of any one of the sub-pixels satisfies:

$$WAPLn = k \times \text{Gray} \times \text{Gray}/(Gmax \times Gmax);$$

where k is a coefficient corresponding to the sub-pixel; Gray is a grayscale of the sub-pixel in the corresponding frame; and Gmax represents a peak grayscale.

5. The display apparatus according to claim 3, wherein the drive controller further comprises a frequency acquisition unit and a duration setting unit;

when a difference between image data in a current frame and image data in a previous frame is greater than a first preset value, the frequency acquisition unit is configured to obtain an occurrence frequency at which the difference is greater than the first preset value, and send the occurrence frequency to the duration setting unit; and the duration setting unit is configured to control an operating duration of the display panel in the conventional mode according to the occurrence frequency.

6. The display apparatus according to claim 5, wherein the duration setting unit is configured to: control the operating duration of the display panel in the conventional mode to be a duration of one frame when the occurrence frequency is less than or equal to a first reference frequency; and control the operating duration of the display panel in the conventional mode to be greater than a duration of one frame when the occurrence frequency is greater than the first reference frequency, and stop calculating a difference between image data in two adjacent frames during a time period in which the display panel operates in the conventional mode.

7. The display apparatus according to claim 1, wherein one of the sub-pixels comprises a pixel drive circuit, the pixel drive circuit receives a first power voltage and a data voltage, and generates a drive current according to the first power voltage and the data voltage; and the display apparatus further comprises a voltage drop compensation unit configured to compensate a voltage drop of the first power supply voltage received by different sub-pixels with the data voltage.

8. The display apparatus according to claim 7, further comprising a data drive circuit configured to provide the data voltage to the pixel drive circuit;

wherein the voltage drop compensation unit comprises:

a voltage detection sub-unit, configured to detect an actual value of the first power supply voltage received by the pixel drive circuit;

a compensation calculation sub-unit, configured to calculate a difference between the actual value and an ideal value of the first power supply voltage, and generate a compensation value according to the difference between the actual value and the ideal value; and the data drive circuit is configured to provide a compensated data voltage to the pixel drive circuit according to the compensation value.

9. The display apparatus according to claim 1, wherein the display apparatus comprises a drive IC, the drive IC comprises a timing controller electrically connected to the drive controller, the drive controller is configured to output a mode control signal to the timing controller, and the mode control signal is configured to enable the timing controller to control the display panel to switch between the multi-frequency mode and the conventional mode.

10. The display apparatus according to claim 9, wherein the drive controller is integrated into the drive IC.

11. The display apparatus according to claim 9, wherein the display apparatus further comprises an application management module electrically connected to the timing controller; and the drive controller is integrated into the application management module.

12. A method for driving a display panel, wherein the display panel comprises a first display region and a second display region, the first display region and the second display region comprise sub-pixels, and the method comprises:

calculating a difference of a current of any sub-pixel between a current frame and a previous frame, and enabling the display panel to operate in a multi-frequency mode or a conventional mode according to the difference, wherein in the multi-frequency mode, the first display region has a different drive frequency from the second display region; and wherein in the conventional mode, the first display region has a same drive frequency as the second display region.

13. The method according to claim 12, wherein the display panel operates in the conventional mode when the difference is greater than a first preset value; and the display panel operates in the multi-frequency mode when the difference is less than or equal to the first preset value.

14. The method according to claim 12, wherein a current WAPLn of any sub-pixel in a corresponding frame satisfies:

$$WAPLn = k \times \text{Gray} \times \text{Gray}/(Gmax \times Gmax);$$

where k is a coefficient corresponding to the sub-pixel; Gray is a grayscale of the sub-pixel in the corresponding frame; and Gmax represents a peak grayscale.

15. The method according to claim 12, wherein enabling the display panel to operate in the conventional mode when the difference is greater than a first preset value, comprises:

obtaining an occurrence frequency at which the difference is greater than the first preset value;

controlling the operating duration of the display panel in the conventional mode to be a duration of one frame when the occurrence frequency is less than or equal to a first reference frequency; and controlling the operating duration of the display panel in the conventional mode to be greater than a duration of one frame when the occurrence frequency is greater than the first reference frequency, and stopping calculating a difference between image data in two adjacent frames during a time period in which the display panel operates in the conventional mode.

* * * * *